US010619559B2

(12) United States Patent
Baudrand et al.

(10) Patent No.: US 10,619,559 B2
(45) Date of Patent: Apr. 14, 2020

(54) METHOD OF CONTROLLING THE AMOUNT OF AIR FED INTO THE INTAKE OF A SUPERCHARGED INTERNAL COMBUSTION ENGINE (71) Applicant: IFP Energies nouvelles, Rueil-Malmaison (FR)

(72) Inventors: Olivier Baudrand, Paris (FR); Thierry Colliou, Les Cotes D'Arey (FR); Jean-Marc Zaccardi, Lyons (FR)

(73) Assignee: IFP ENERGIES NOUVELLES, Rueil-Malmaison (FR)

(*) Notice: Subject to any disclaimer, the term of this patent is extended or adjusted under 35 U.S.C. 154(b) by 257 days.

(21) Appl. No.: 15/568,176

(22) PCT Filed: Apr. 12, 2016

(86) PCT No.: PCT/EP2016/057986
§ 371 (c)(1),
(2) Date: Oct. 20, 2017

(87) PCT Pub. No.: WO2016/169805
PCT Pub. Date: Oct. 27, 2016

(65) Prior Publication Data
US 2018/0149075 A1 May 31, 2018

(30) Foreign Application Priority Data
Apr. 22, 2015 (FR) .................... 15 53583

(51) Int. Cl.
*F02B 37/02* (2006.01)
*F02B 37/10* (2006.01)
*F02B 37/16* (2006.01)

(52) U.S. Cl.
CPC ............ *F02B 37/025* (2013.01); *F02B 37/10* (2013.01); *F02B 37/168* (2013.01); *Y02T 10/144* (2013.01)

(58) Field of Classification Search
CPC ...... F02B 37/025; F02B 37/10; F02B 37/168; Y02T 10/144
(Continued)

(56) References Cited

U.S. PATENT DOCUMENTS 3,877,230 A * 4/1975 Overy .................. F02B 37/025
60/606
4,373,336 A 2/1983 Horler et al.
(Continued)

FOREIGN PATENT DOCUMENTS

DE 10232519 A1 1/2004
EP 1138928 A2 10/2001
(Continued)

OTHER PUBLICATIONS

International Search Report for PCT/EP2016/057986 dated Jun. 27, 2016; English translation submitted herewith (7 pages).

*Primary Examiner* — Thai Ba Trieu
(74) *Attorney, Agent, or Firm* — Fitch, Even, Tabin & Flannery LLP (57) ABSTRACT The present invention controls the amount of air fed to the intake of a supercharged internal-combustion engine. The engine includes two exhaust gas outlets (32, 36) each connected to an exhaust manifold (30, 34) of a group of at least one cylinder (12₁, 12₂, 12₃, 12₄), a turbocharger with a dual-inlet (46, 48) turbine (40) connected to the exhaust gas outlets, and to an outside air compressor (44), and a duct (64) for partial transfer of the compressed air from the compressor to the turbine inlets. Two branches (70, 72) of the partial transfer duct, are connected to the turbine inlets. Each branch carries proportional throttle (74, 76), and the
(Continued)

compressed air circulation in the branches is controlled during transient operation phases according to strategies applied to the proportioned throttle valves and determined in accordance with the stabilized phase characteristics.

13 Claims, 7 Drawing Sheets

(58) Field of Classification Search
 USPC .................................................. 60/606, 602
 See application file for complete search history.

(56) References Cited

U.S. PATENT DOCUMENTS

| | | | |
|---|---|---|---|
| 4,404,805 A | 9/1983 | Curtil | |
| 4,426,848 A * | 1/1984 | Stachowicz | F02B 37/16 60/606 |
| 4,559,784 A * | 12/1985 | Jenny | F02B 37/10 60/606 |
| 4,561,253 A * | 12/1985 | Curtil | F02B 37/10 60/606 |
| 4,608,828 A * | 9/1986 | Mikota | F02B 37/16 60/606 |
| 6,470,864 B2 * | 10/2002 | Kim | F02B 37/10 60/606 |
| 7,231,760 B2 * | 6/2007 | Busch | F02B 37/168 60/605.1 |
| 7,451,597 B2 * | 11/2008 | Kojima | F02B 39/10 60/605.1 |
| 2016/0131021 A1 * | 5/2016 | Baker | F02B 37/025 60/605.1 |
| 2018/0128160 A1 * | 5/2018 | Colliou | F02B 37/025 |
| 2018/0142610 A1 * | 5/2018 | Colliou | F02B 37/025 |
| 2018/0171866 A1 * | 6/2018 | Colliou | F02B 37/025 |

FOREIGN PATENT DOCUMENTS

| | | | | |
|---|---|---|---|---|
| FR | 2448034 A1 | 8/1980 | | |
| FR | 2478736 A1 | 9/1981 | | |
| FR | 2864994 A1 | 7/2005 | | |
| GB | 1140877 A | 1/1969 | | |
| JP | 05086877 A * | 4/1993 | | F02B 37/10 |

\* cited by examiner

METHOD OF CONTROLLING THE AMOUNT OF AIR FED INTO THE INTAKE OF A SUPERCHARGED INTERNAL COMBUSTION ENGINE

CROSS-REFERENCE TO RELATED APPLICATIONS

This application is a U.S. national phase application filed under 35 U.S.C. § 371 of International Application No. PCT/EP2016/057986, filed Apr. 12, 2016, designating the United States, which claims priority from French Patent Application No. 15/53.583, filed Apr. 22, 2015, which are hereby incorporated herein by reference in their entirety.

BACKGROUND OF THE INVENTION

Field of the Invention

The present invention relates to a method of controlling a device feeding an amount of air to the intake of a supercharged internal-combustion engine, notably a stationary engine or an automotive or industrial vehicle engine.

Description of the Prior Art

As it is widely known, the power delivered by an internal-combustion engine depends on the amount of air fed to the combustion chamber of this engine, which is itself proportional to the density of the air.

Thus, it is usual to increase the amount of air through compression of the outside air before it is allowed into the combustion chamber. This operation, known as supercharging, can be carried out by any means such as a turbocharger or a driven compressor, which can be a centrifugal or a positive-displacement compressor.

In case of supercharging using a turbocharger, the latter comprises a rotary single-flow or double-flow turbine connected by a shaft to a rotary compressor. The exhaust gases from the engine flow through the turbine, which is then rotated. This rotation is thereafter transmitted to the compressor which, by its rotation, compresses the outside air before it is fed to the combustion chamber.

As is better described in French patent application No. 2,478,736, it is intended to increase the compression of the outside air by the compressor even further so as to be able to significantly raise this amount of compressed air in the compression chamber of the engine.

This is achieved in particular by increasing the rotational speed of the turbine and therefore of the compressor.

Part of the compressed air exiting the compressor is therefore diverted in order to be directly allowed to the turbine inlet while mixing with the exhaust gases. This turbine is then traversed by a larger amount of fluid (mixture of compressed air and exhaust gas), which allows the rotational speed of the turbine, and therefore of the compressor, to be increased. This compressor speed increase thus allows raising the pressure of the outside air that is compressed in this compressor prior to being fed to the combustion chamber of the engine.

Thus, the compressed air has a higher density, which allows the amount of air contained in the combustion chamber to be increased.

This type of supercharged engine, although satisfactory, however involves some significant drawbacks.

Indeed, the flow of compressed air admitted at the turbine inlet is not correctly controlled, which may lead to malfunction of the engine.

Thus, by way of example, in case of too large amounts of compressed air being diverted to the turbine inlet, the exhaust gases entering the turbine are cooled too much by this air, which causes a decrease in the overall supercharging efficiency.

SUMMARY OF THE INVENTION

The present invention overcomes the aforementioned drawbacks with a method of controlling a device feeding an amount of air to the intake of a supercharged internal-combustion engine which can meet all engine power requirements, in particular in transient operational phases.

The present invention thus allows managing and conducting compressed air transfer from the intake to the exhaust, even when the average pressure of the compressed air at the intake is lower than that of the gases at the exhaust. All that is needed is phases during the engine running cycle where the intake pressure is higher than the exhaust pressure.

Thus, the present invention relates to a method of controlling the amount of air fed into the intake of a supercharged internal-combustion engine, the engine comprising two exhaust gas outlets each connected to an exhaust manifold of a group of at least one cylinder, comprising a supercharging device including a turbocharger with a dual-inlet turbine connected to the exhaust gas outlets, as well as an outside air compressor, and a duct for partial transfer of the compressed air from the compressor to the turbine inlets, characterized in that two branches are provided on the partial transfer duct, the branches being connected to the turbine inlets and each carrying a proportional throttling means or proportional throttle valve, and in that the compressed air circulation in the branches is controlled during transient operation phases according to strategies applied to said throttling means and determined in accordance with the stabilized phase characteristics.

A non-return valve can be further arranged on each of the branches.

The branches can be connected by a connecting line.

The connecting line can be provided with the throttling means or proportional throttle valve.

The compressed air circulating in the transfer duct can be heated.

For a control strategy, the following steps can be carried out:
  from a state of the throttling means or throttle valves opening setting for an initial stabilized state;
  reducing the setting according to a predetermined gradient, down to a value maintained for a time t,
  increasing the setting according to a predetermined gradient to reach the throttling opening setting for a final stabilized state.

The initial state can be a low-load state and the final state can be a high-load state. The throttling means for opening setting states for the initial and final stabilized states can be identical.

BRIEF DESCRIPTION OF THE DRAWINGS

Other features and advantages of the invention will be clear from reading the description hereafter, given by way of non limitative example, with reference to the accompanying figures wherein.

DETAILED DESCRIPTION OF THE INVENTION

Figure 1:
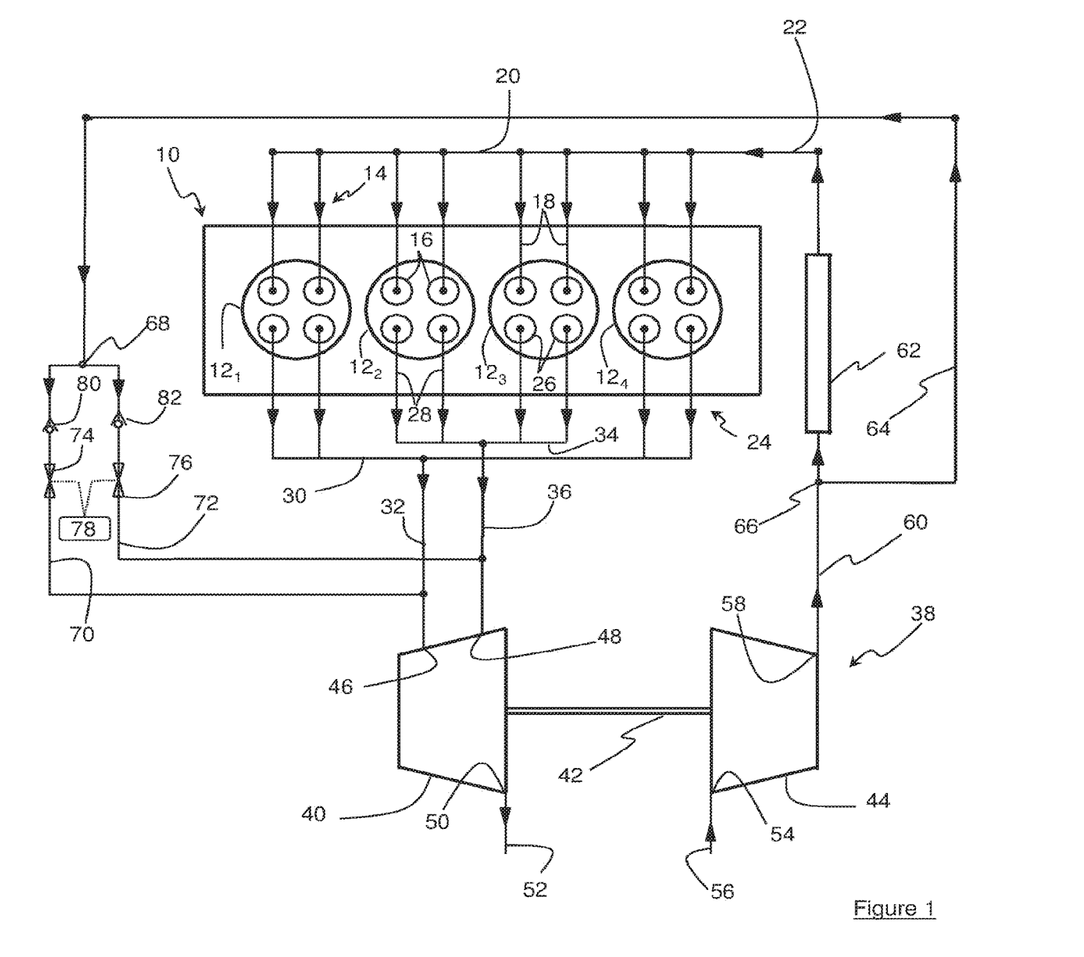
FIG. 1 illustrates an internal-combustion engine with its supercharging device used according to the invention.

In FIG. 1, internal-combustion engine 10 comprises at least two cylinders. Four cylinders are identified with reference numerals $12_1$ to $12_4$ from the left of the figure.

Preferably, this engine is a direct-injection internal-combustion engine, notably of Diesel type, which does not exclude any other type of internal-combustion engine.

Each cylinder comprises an intake 14 with at least one intake valve 16 with two intake valves each controlling an intake pipe 18 as shown. Intake pipes 18 guide flow to an intake manifold 20 supplied with intake air, such as compressed air, through an intake air supply line 22.

This cylinder also comprises burnt gas exhaust means 24 with at least one exhaust valve 26 with two valves controlling each an exhaust pipe 28 as shown.

In the example shown, the engine is designed to operate with a firing order 1-3-4-2. Considering this firing order, the exhaust pipes of first cylinder $12_1$ and second cylinder $12_4$ (making up a first group of at least one cylinder) are connected to a first exhaust manifold 30 with a first exhaust gas outlet 32. The exhaust pipes of the third and fourth cylinders $12_2$ and $12_3$ making up a second group of at least one cylinder are connected to a second exhaust manifold 34 comprising a second exhaust gas outlet 36.

The two exhaust gas outlets open into a turbocharger 38 for compression of the air and more particularly into expansion turbine 40 of this turbocharger.

As illustrated in FIG. 1, the turbocharger is a twin-scroll turbocharger.

This type of turbocharger comprises expansion turbine 40 scavenged by the exhaust gas, which is connected in rotation by a shaft 42 with a compressor 44.

At the turbine, the exhaust gas inlet is divided into two sections. A first inlet section 46 is connected to first exhaust gas outlet 32 of first exhaust manifold 30 and a second inlet section 48 is connected to second exhaust gas outlet 36 of second exhaust manifold 34.

Gas outlet 50 of turbine 40 is conventionally connected to exhaust line 52 of the engine.

Compressor 44 of turbocharger 38 comprises an outside air intake 54 supplied by a supply line 56. Compressed air outlet 58 of this compressor is connected to supply line 22 of intake manifold 20 by a duct 60.

Advantageously, a compressed air-cooling radiator 62 may be provided on duct 60, between the compressor 44 and line 22.

As is better seen in FIG. 1, a transfer duct 64 allows circulation of part of the compressed air from compressor 44 towards turbine inlets 46 and 48.

More precisely, this partial transfer duct originates from duct 60 at an intersection point 66 between the compressor and cooling radiator 62, and it divides at a bifurcation point 68 into two branches 70 and 72. Branch 70 leads to turbine inlet 46 through its junction with first exhaust gas outlet 32 and branch 72 leads to the other inlet 48 of this turbine through its junction with exhaust gas outlet 36.

Each branch carries throttling means 74 and 76, such as a proportional throttle valve, controlled by a control means or controller 78 that can be shared by the two throttling means or proportional throttle valves. Each proportional valve thus allows controlling the flow rate of the compressed air stream circulating in each branch 70 and 72.

Advantageously, each branch also comprises a non-return valve 80 and 82 preventing compressed air circulation from the branch to the compressor 44 while preventing communication between the two branches.

This configuration thus allows, during operation of the engine, taking advantage of the exhaust low-pressure zones occasionally prevailing in the exhaust manifolds in order to feed compressed air into the turbine and thus to increase the flow rate of this turbine, and therefore of the compressor. This also allows achieving more efficient supercharging at low engine speeds and notably managing the transient phases with suitable proportional valve control strategies.

During operation, in case a large amount of air is required in the cylinders, opening of valves 74 and 76 is controlled to feed compressed air from compressor 44 into turbine 40.

The compressed air exiting compressor 44 circulates in duct 64, then in branches 70 and 72 prior to reaching exhaust gas inlets 46 and 48 of turbine 40, thus providing surplus fluid supply to this turbine.

Thus, the turbine is traversed not only by the exhaust gases from outlets 32 and 36, but also by compressed air that comes on top of these gases. Therefore, the rotation of the turbine is increased, which causes an increase in the rotation of the compressor and, consequently, an increase in the pressure of the compressed air exiting this compressor.

Proportional throttle valves 74 and 76 are controlled by control means or controller 78 to control the amount of compressed air fed into the turbine according to the engine supercharging requirements, in particular during the transient phases between two stabilized operation phases.

Figure 2:
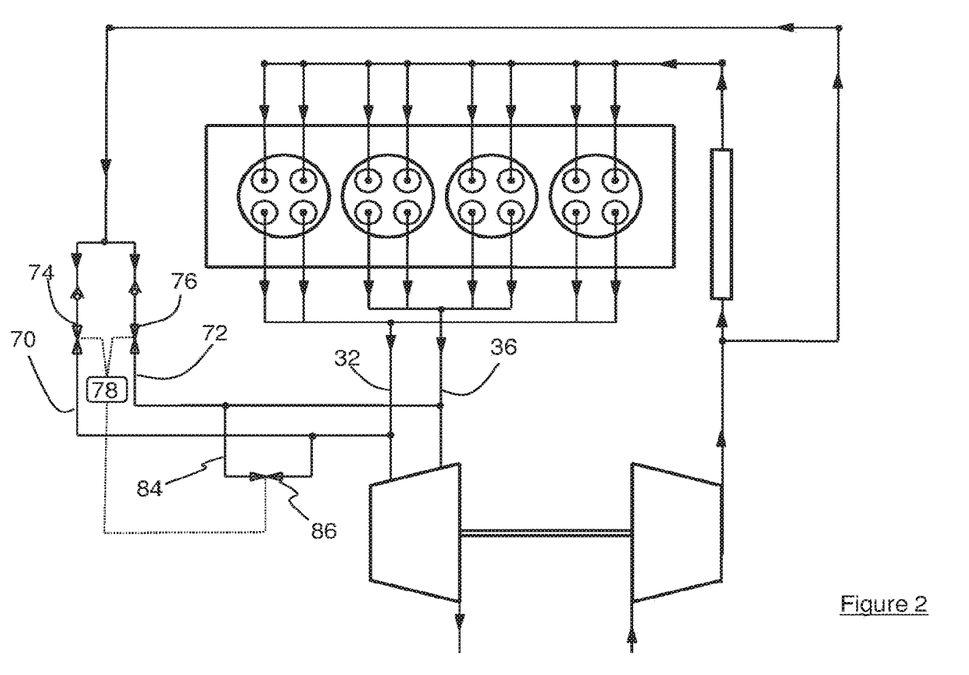
FIG. 2 is a variant of the internal-combustion engine with its supercharging device.

The variant of FIG. 2 differs from FIG. 1 in that a connecting line 84 is provided between the two branches 70 and 72. This line is fitted with throttling means 86 such as a proportional throttle valve, which is here also controlled by control means or controller 78.

One of the ends of this line is connected to branch 70 at a point between proportional control valve 74 and exhaust gas outlet 32, and the other end at a point between proportional throttle valve 76 and exhaust gas outlet 36.

This line allows controlling of the fluid communication between the two branches arriving at the turbine.

More precisely, this connecting line allows diverting part of the compressed air circulating in one of the branches to feed diverted air into the other branch while mixing with the exhaust gases at the inlets of turbine 40.

Furthermore, the connecting line allows coupling to a branch of the turbine the pressure differential of the exhaust gas (or exhaust pulsatile flow) of the other branch that is angularly offset in the engine combustion cycle.

Figure 3:
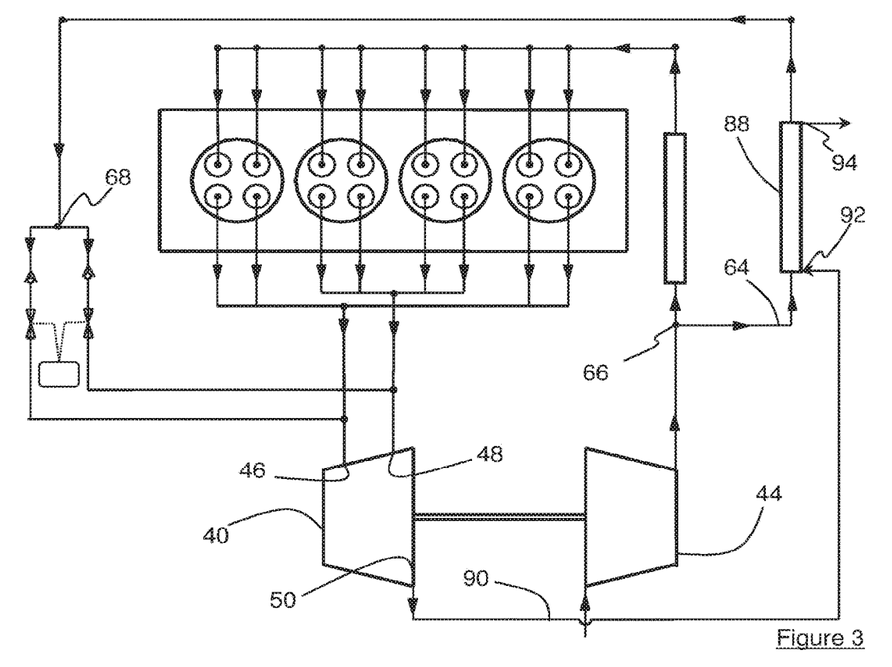
FIG. 3 illustrates a variant of the internal-combustion engine with its supercharging device according to FIG. 1, FIGS. 4 to 10 show examples of management control strategies for the throttling means or proportional throttling valves.

In FIG. 3, which essentially comprises the same elements as FIG. 1, the compressed air exiting compressor 44 and circulating in transfer duct 64 is heated prior to being fed to turbine 40.

Transfer duct 64 therefore carries a compressed air heating means or heater 88, which here is a heat exchanger in the form of a heating radiator, arranged between intersection point 66 and bifurcation point 68 included in this duct. This radiator is traversed by the compressed air circulating in the duct while being traversed by the engine exhaust gases. These exhaust gases come from outlet 50 of the turbine and they are carried by a pipe 90 to inlet 92 of the radiator. The exhaust gases flow through this radiator by transferring the heat they contain to the compressed air prior to exiting this radiator through outlet 94 where they are sent to the engine exhaust line.

Thus, part of the energy of the exhaust gases is recovered by the compressed air that is fed to the turbine through either of inlets 46 and 48.

This heated compressed air thus allows providing additional energy to the turbine, which consequently rotates at higher speed. This high rotational speed is then transmitted to the compressor, which will perform greater compression of the outside air.

The present invention is particularly well suited for managing the transient operation phases between two stabilized operation phases. "Stabilized operation" is understood to be a state wherein all of the engine actuators are not modified, for example when the amounts of fuel injected are constant over time, the EGR rate remains constant, the actuator of the turbocharger is in the same position, etc. Conversely, "transient operation" is understood to be the phase wherein some actuators are activated in response to an evolution of the user's power request. One example is the case of a "load build-up" where the user requests the engine to switch from a low-load state (low torque, low power) to a high-load state (high torque, high power). This load build-up can be achieved either at constant engine speed, or with simultaneous load and engine speed increase. The example of a "slowdown", that is a more or less sudden decrease in torque request, can also be considered. In each case, the engine actuators need to be controlled in order to ensure optimal operation of the powertrain.

The present improvement optimizes the engine dynamics during transient operation by controlling the opening and closing of the proportional throttling means of proportional throttle valves allowing gas passage from the compressed air partial transfer duct to the inlets of turbine 40.

In general, these transient phases can be defined as transition phases between two stabilized states where the scavenging level, enabled by proportional throttle valves 74 and 76, is stabilized and optimum regarding the engine performances expected at each of these operating points. Optimum control of the partial transfer loop throttling means or proportional throttle valves applies a predetermined strategy for the evolution of the throttling means or proportional throttle valves closing or opening trajectory, for switching from one stabilized state to another stabilized state under optimized conditions.

Figure 4:
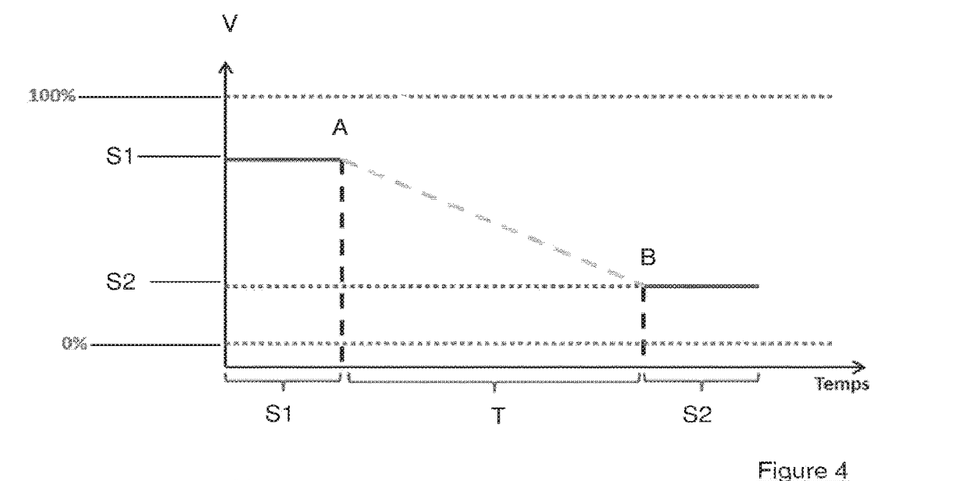

FIG. 4 schematically illustrates this transition situation between points A, representative of stabilized point (S1) before the transient phase, and B, representative of stabilized point (S2) after transient phase (T). Point A can correspond for example to the start of a load build-up and point B to the time from which the desired torque is reached. This can also illustrate a load decrease between A and B. The transient phase is shown in the following figures illustrating examples of several strategies for optimum management of the transition between the two stabilized states A and B.

In FIG. 4, "100%" and "0%" respectively designate the complete opening and closing of the gas passage through throttling means or proportional throttle valves 74 and 76 (V) as a function of time (in seconds). According to the invention, the transient phases management method applies predetermined control strategies comprising at least one proportional valve opening (and/or closing) sequence to obtain optimized operation of compressor 44 driven by turbine 40 for switching from one stabilized state to another.

FIGS. 5 to 10 illustrate various examples of scavenging level management during the transient phase. The "scavenging level" is understood to be here the amount of gas fed through compressed air partial transfer duct 64 to the turbine inlets.

Figure 5:
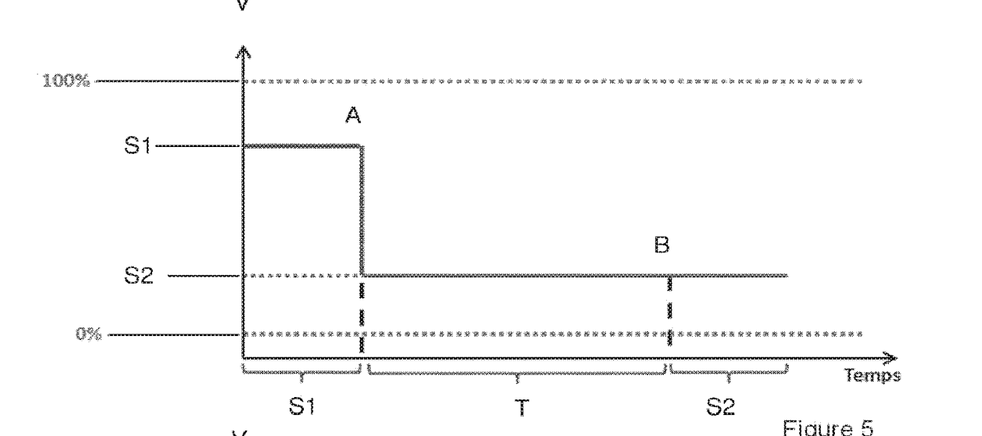

FIG. 5 corresponds to the case of a "scavenging" suddenly cut off upon start of the transient phase at A to position it on the setting corresponding to stabilized operating point B. It can be noted that suddenly cutting off "scavenging" does not mean that the engine reaches its second stabilized operating point B immediately.

Figure 6:
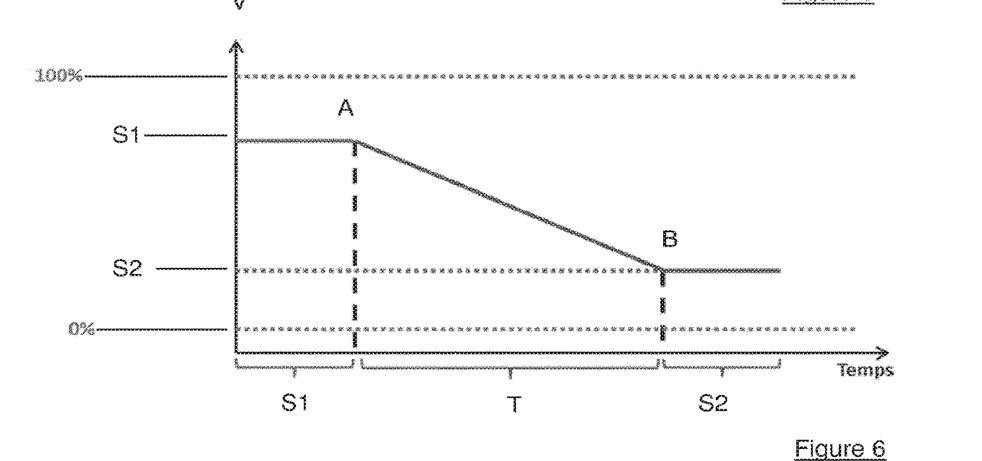

FIG. 6 corresponds to the case of a "scavenging" cut off in a progressive manner, substantially linear or not, during the transient phase.

Figure 7:
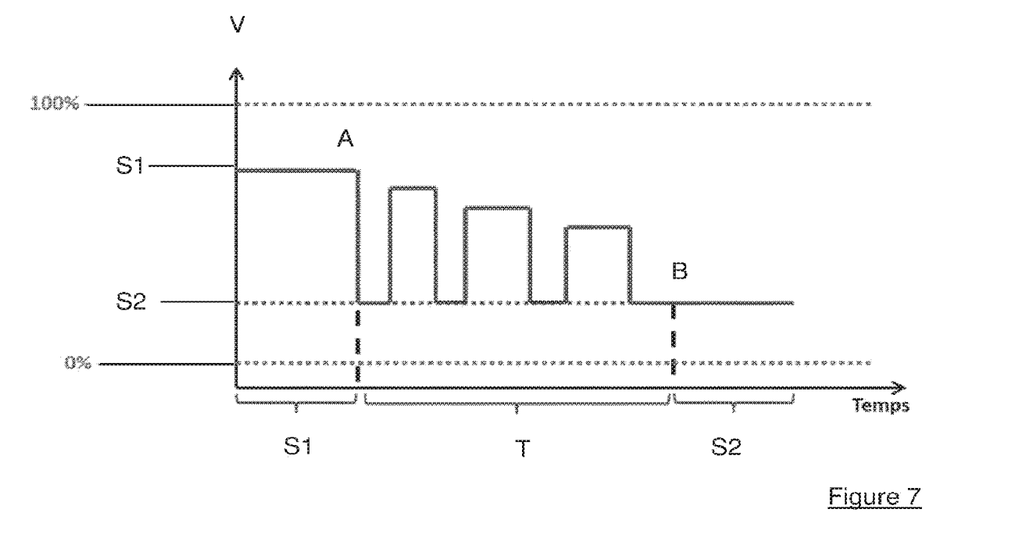

FIG. 7 corresponds to the case of an intermittent "scavenging" strategy during the transient phase. Several proportional valve opening and closing sequences are performed between the throttling positions of stabilized phases A and B.

Figure 8:
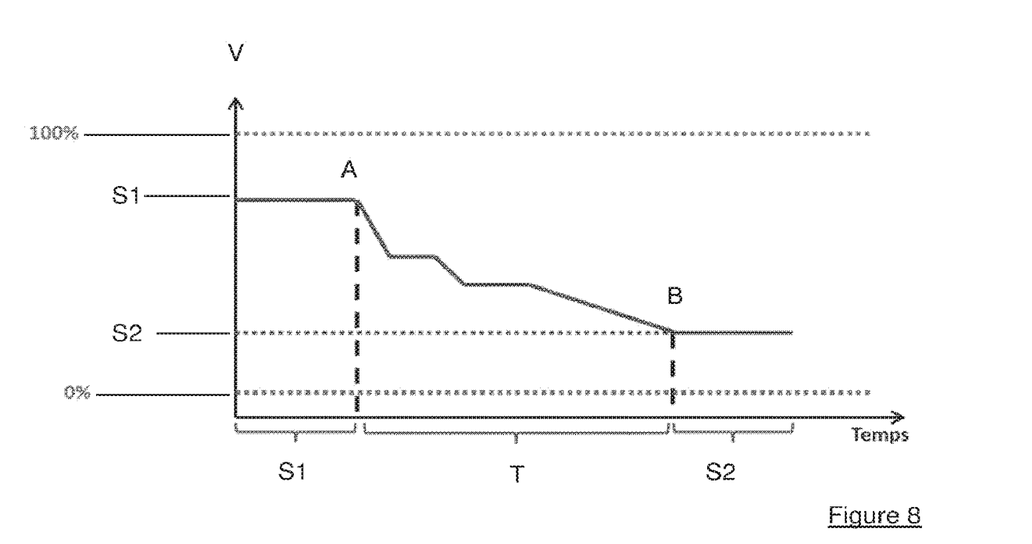

FIG. 8 corresponds to the case of a "scavenging" progressively cut off by maintaining stages during the transient phase.

Selection of the optimum proportional valve management method or control strategy during the transient phase essentially depends on the characteristics of the initial stabilized operating point (point A) and on those of the targeted stabilized operating point (point B). In other words, the throttling means or proportional throttle valves control strategy needs to be optimized to best match the characteristics of the engine operating points (load, speed, flow, richness, time spent at each operating point, etc.) and of the supercharging operating points (rotational speed, surge margin, etc.).

The case of a load build-up, that is a fast increase in the engine power request, can be described by way of example. For this example a case of transient operation with three main phases is considered:
 phase 1: engine stabilized at a low-load operating point;
 phase 2: load build-up transient;
 phase 3: engine stabilized at a high-load operating point (higher load than in the "low-load" first phase).

"Scavenging" is considered to be active both at the first low-load operating point (first phase) and at the second high-load operating point with a level that may be different from the first phase depending on the engine requirements specific to this load level. It is also envisaged to allow scavenging during the transient phase, at variable levels, according to the examples illustrated above.

Figure 9:
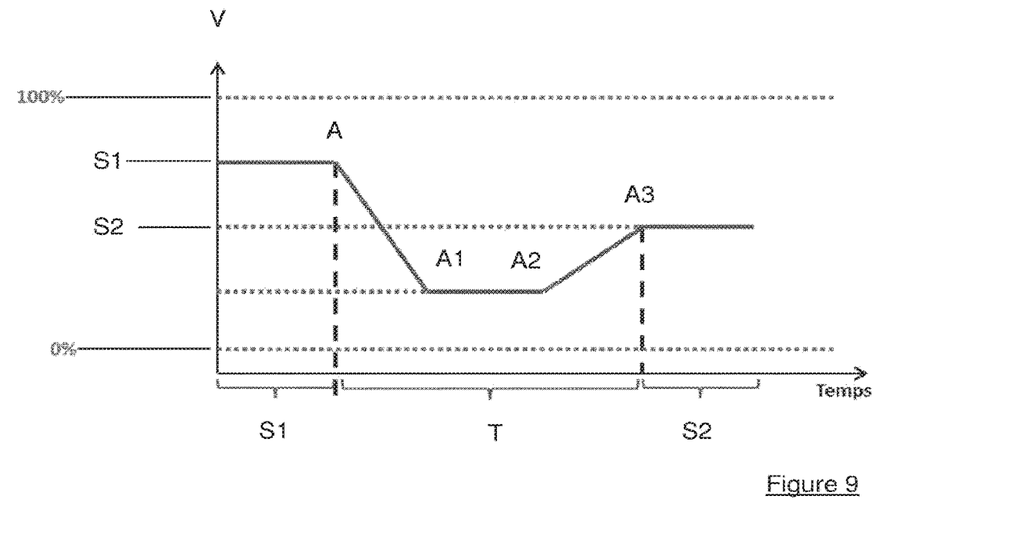

FIG. 9 schematically illustrates a case of load build-up with simplified scavenging management. First, scavenging is progressively cut off at the start of the transient phase (trajectory A-A1), then a stage is maintained at a given "scavenging" level during the transient phase (trajectory A1-A2), and "scavenging" is progressively increased at the end of the transient phase (trajectory A2-A3).

Figure 10:
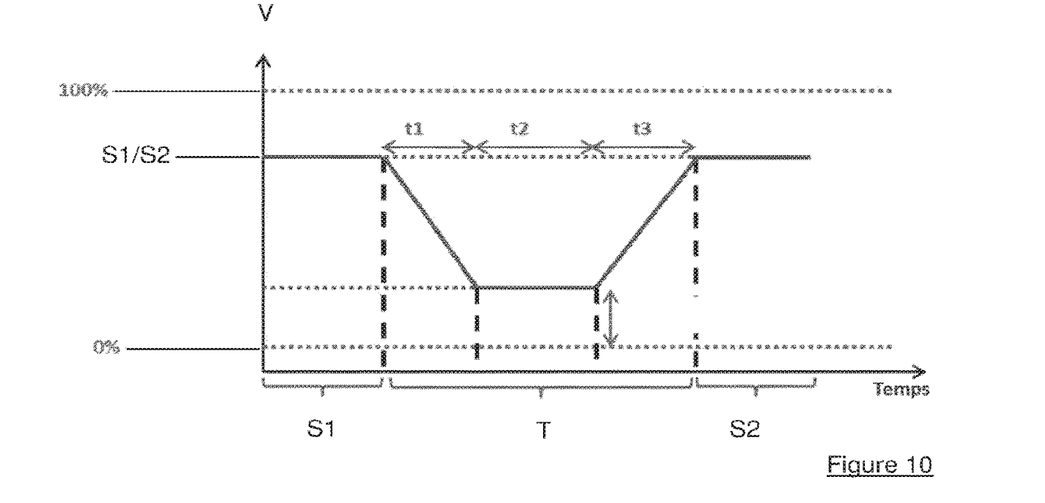

FIG. 10 illustrates the example where the two stabilized phases are operated at the same "scavenging" level, that is with the same proportional valve settings. It is considered that only the closing level occurring during the transient phase can be modified. This strategy is based on 4 parameters: the scavenging cut-off delay (t1), the cut-off time (that is the time during which scavenging is reduced or banned, t2), the scavenging restart delay (t3) and the cut-off "level".

The implementations show that a compromise needs to be found between:
- a fast restart of "scavenging", which may lead to a torque "hole" (related to the intake/exhaust pressure balances, the residual gas rate in the combustion chamber, etc.);
- a prolonged shutdown of the "scavenging" system, which may lead to a decrease in the rotational speed of the turbine, and this decrease can subsequently affect the entire dynamics when "scavenging" is allowed again.

A previously identified optimum strategy is:
- in cutting off scavenging very rapidly at the start of the transient phase so as to obtain fast load build-up. Indeed, since the "low-load" operating point allows scavenging, the engine has a good richness margin for enriching the mixture rapidly and increasing the load (without however emitting fumes);
- then in partially cutting off scavenging shortly (for about 0.2 to 0.3 second in the simulated cases) to not collapse the rotational speed of the turbine (partial cut-off allows a priori to maintain a flow rate and the turbine speed during the transient phase);
- and finally, in restarting scavenging "gently" to not cause a torque "hole".

Figure 11:
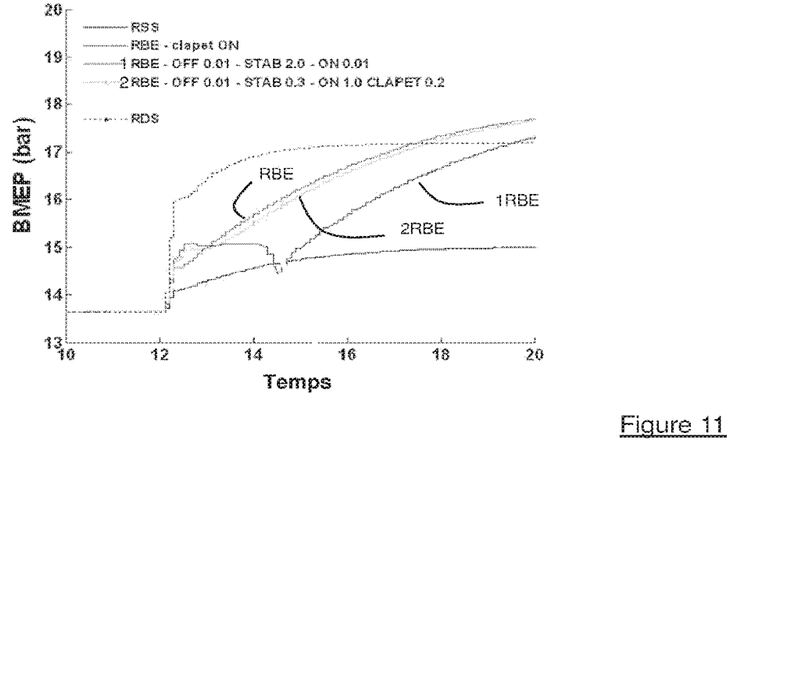
FIGS. 11 and 12 show examples of operation of a powertrain according to the application of the present invention and FIG. 13 is a flow chart of a method in accordance with the invention.

This optimum strategy, as well as other simulated cases, is illustrated in FIG. 11. Curve RSS corresponds to the reference operation "Reference Single Supercharging". Curve RDS corresponds to a case of "Reference Dual Supercharging", an asymptotic case mentioned in this figure only by way of example with, the scavenging system a priori allowing a single-supercharged engine to perform better without however reaching the performances of a dual-supercharged engine.

The other curves correspond to a single-supercharged engine equipped with a compressed air partial transfer system, or so-called "scavenging" system, according to the invention. Curve RBE (Reference External Scavenging) corresponds to the case allowing continuous scavenging, that is at the low-load point, during the transient phase and at the high-load point.

Curve 1RBE-OFF0.01-STAB2.0-ON0.01 corresponds to a case where the scavenging cut-off delay is 0.01 second, the scavenging ban time is 2.0 seconds and the scavenging restart delay is 0.01 second. It has been observed in this case that a torque "hole" appears when scavenging is restarted after being stopped for too long.

Curve 2RBE-OFF0.01-STAB0.3-ON0.2 finally corresponds to an optimum case where the scavenging cut-off delay is 0.01 second, the scavenging ban time is 0.2 second and the scavenging restart delay is 0.2 second. As can be seen in the figure, this scavenging control strategy allows fast load build-up to be obtained.

Figure 12:
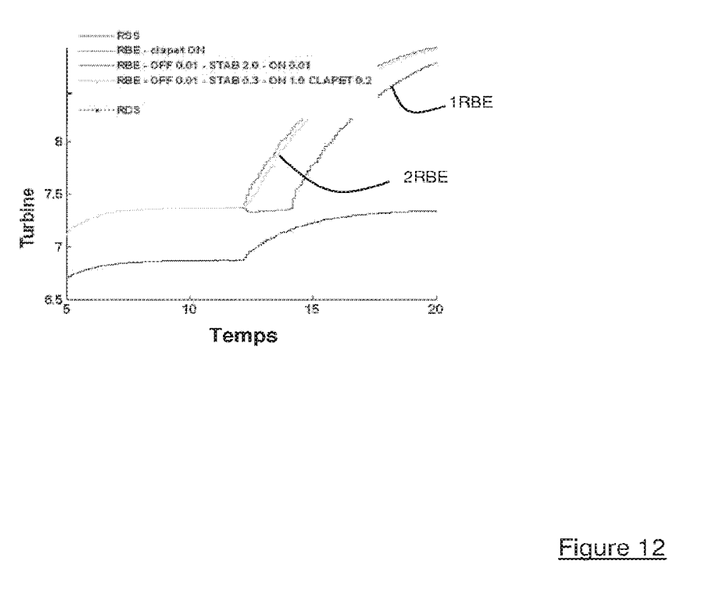

FIG. 12 illustrates the evolution of the rotational speed of turbine 40. The slight speed decrease that corresponds to the case banning scavenging at excessive length can notably be observed.

Figure 13:
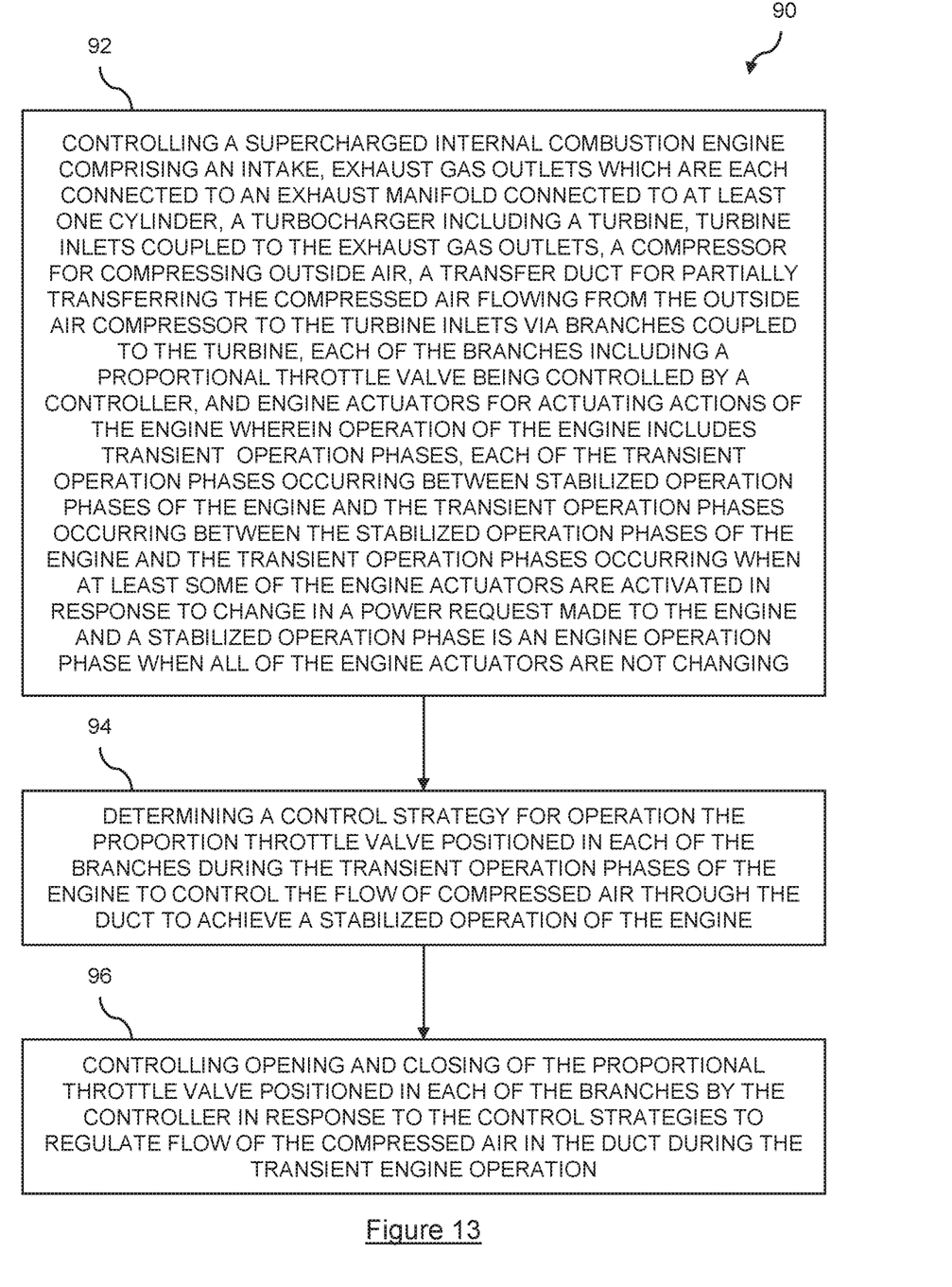

FIG. 13 is a flow chart of a method 90 in accordance with the invention. The method is performed with a supercharged internal combustion engine as recited in block 92. The engine includes an intake, exhaust gas outlets which are each connected to an exhaust manifold connected to at least one cylinder, a turbocharger including a turbine, turbine inlets coupled to the exhaust outlets, a compressor for compressing outside air, a transfer duct for partially transferring the compressed air flowing from the outside air compressor to the turbine inlets via branches coupled to the turbine inlets, each of the branches including a proportional throttle valve being controlled by a controller, and engine actuators for actuating actions of the engine wherein operation of the engine includes transient operation phases. Each of the transient operation phases occurs between stabilized operation phases of the engine and the transient operation phases occur when at least some of the engine actuators are activated in response to a change in a power request made to the engine. A stabilized operation phase occurs when all of the engine actuators are not changing. The step illustrated in block 94 determines control strategies for operating the proportional valves 94, 96 positioned in each of the branches during the transient operation phases of the engine to control the flow the compressed air through the duct to achieve a stabilized operation of the engine. The step illustrated in block 96 controls opening and closing of the proportional valve positioned in each of the branches by the controller is in response to the control strategies to regulate the flow of the compressed air in the duct during transient engine operation. The engines for practicing the invention are for example without limitation illustrated in FIGS. 1-3.

As mentioned above, the optimum control strategy varies from one engine to another, the values of the various control parameters given here are therefore provided for information only.

The invention claimed is:

1. A method of controlling a supercharged internal combustion engine comprising an intake, exhaust gas outlets which are each connected to an exhaust manifold connected to at least one cylinder, a turbocharger including a turbine, turbine inlets coupled to the exhaust gas outlets, a compressor for compressing outside air, a transfer duct for partially transferring the compressed air flowing from the outside air compressor to the turbine inlets via branches coupled to the turbine inlets, each of the branches including a proportional throttle valve being controlled by a controller, and engine actuators for actuating actions of the engine wherein operation of the engine includes transient operation phases, each of the transient operation phases occurring between stabilized operation phases of the engine and the transient operation phases occurring when at least some of the engine actuators are activated in response to change in a power request made to the engine and a stabilized operation phase operation is an engine operation phase when all of the engine actuators are not changing, the method comprising:
- determining control strategies for operating the proportional throttle valve positioned in each of the branches during the transient operation phases of the engine to control the flow of the compressed air through the transfer duct to achieve a stabilized operation of the engine; and
- controlling opening and closing of the proportional throttle valve positioned in each of the branches by the controller in response to the control strategies to regulate the flow of the compressed air in the transfer duct during the transient engine operation.

2. The method in accordance with claim 1, further comprising:
- preventing the flow of the compressed air back to the compressor with a non-return valve positioned in each of the branches.

3. The method in accordance with claim 1, further comprising:
- diverting the flow of the compressed air from one of the branches toward another of the branches via a connecting line.

4. The method in accordance with claim 3, comprising:
positioning the proportional throttle valve in the connecting line to adjust the flow of the compressed air in each of the branches supplied to the turbine inlets.

5. The method in accordance with claim 1, further comprising:
heating the compressed air circulating in the transfer duct with a heater thermally coupled to the transfer duct.

6. The method in accordance with claim 1, wherein the control strategies comprise:
setting an opening position of the proportional throttle valves at an initial state in a low load state;
reducing the opening position of the proportional throttle valves according to a gradient for a time period t; and
increasing the opening position of the proportional throttle valves after the time t according to a gradient until the opening position of the proportional throttle valves reaches a finalized opening position identical to the initial opening position set at a final state which is high load state.

7. A supercharged internal combustion engine comprising:
an intake and exhaust gas outlets which are each connected to an exhaust manifold connected to at least one cylinder;
a turbocharger including a turbine, turbine inlets coupled to the exhaust gas outlets, and a compressor for compressing outside air;
a transfer duct for partially transferring a flow of the compressed air flowing from the outside air compressor to the turbine inlets;
branches coupled to the inlets with each of the branches located in the transfer duct and containing a proportional throttle valve;
a controller which controls opening and closing of the proportional throttle valves during engine operation; and
engine actuators for actuating actions of the engine during operation; and wherein
the operation of the engine includes transient operation phases, each transient operation phase occurring between stabilized operation phases of the engine and the transient operation phases occurring when at least some of the engine actuators are activated in response to change in a power request made to the engine and a stabilized operation is an engine operation phase when all of the engine actuators are not changing, and the controller provides control strategies for controlling the proportional operation of the proportional throttle valves during the transient operation of the engine to control the flow of the compressed air through the duct with the control strategies being determined in accordance with characteristics of engine operation during the stabilized operation of the engine; and
the control strategy provided by the controller controls opening and closing of the proportional throttle valves to regulate flow of compressed air in the duct during the transient engine operation.

8. The engine in accordance with claim 7, wherein each of the branches includes a non-return valve for preventing the flow of the compressed air from each of the branches back to the compressor.

9. The engine in accordance with claim 7, comprising:
a connecting line which connects the branches and diverts compressed air from one of the branches toward another of the branches during at least one operational phase of the engine.

10. The engine in accordance with claim 9, wherein the connecting line includes a proportional throttle valve.

11. The engine in accordance with claim 7, comprising:
a heater disposed in the transfer duct for heating the flow of the compressed air flowing in the transfer duct.

12. The engine in accordance with claim 11, wherein an initial engine state is a low load state and a final engine state is a high load state.

13. The engine in accordance with claim 12, wherein opening positions of the proportional throttle valves in the initial engine state and in the final engine state are set to be identical.

* * * * *